March 24, 1970 ATSUSHI TOMOZAWA ET AL 3,502,901

DIGITAL CIRCUIT HAVING INDUCTIVE COUPLING AND TUNNEL DIODE

Filed Sept. 12, 1967 3 Sheets-Sheet 1

INVENTORS
ATSUSHI TOMOZAWA
RIKIO MARUTA
BY
Hopgood & Calimafde
ATTORNEYS

DIGITAL CIRCUIT HAVING INDUCTIVE COUPLING AND TUNNEL DIODE

Filed Sept. 12, 1967 3 Sheets-Sheet 2

INVENTORS
ATSUSHI TOMOZAWA
RIKIO MARUTA
BY
Hopgood & Calimafde
ATTORNEYS

March 24, 1970 ATSUSHI TOMOZAWA ET AL 3,502,901

DIGITAL CIRCUIT HAVING INDUCTIVE COUPLING AND TUNNEL DIODE

Filed Sept. 12, 1967 3 Sheets-Sheet 3

INVENTORS
ATSUSHI TOMOZAWA
RIKIO MARUTA

BY Hopgood & Calimafde

ATTORNEYS 3,502,901
DIGITAL CIRCUIT HAVING INDUCTIVE COUPLING AND TUNNEL DIODE

Atsushi Tomozawa and Rikio Maruta, Tokyo-to, Japan, assignors to Nippon Electric Company, Limited, Tokyo-to, Japan, a corporation of Japan Filed Sept. 12, 1967, Ser. No. 667,107
Claims priority, application Japan, Sept. 24, 1966, 41/62,878
Int. Cl. H03k *19/08*
U.S. Cl. 307—206 10 Claims

ABSTRACT OF THE DISCLOSURE

A digital circuit of the current switching type which employs transistors and a negative resistance element with an inductive coupling circuit therebetween, and wherein switching is achieved by means of pulses which cause the coupling circuit to trigger the element, thus providing pulses at the output of the element.

Background of the invention

As those knowledgeable in the digital circuit art are aware, the current switching circuit is one of the transistorized circuits presently employed for high speed digital applications. It is extremely difficult however with these current switching circuits to raise the clock frequency of the digital data transmission or data process equipment as a whole, up to higher than 100 mHz. The reasons for this are that a number of Fan-in's and Fan-out's are required for the many complicated connections between the circuits, and also that there is an unavoidable increase in delay due to these connections. Moreover, if all the circuits employed as a part of the equipment are of the current switching type, not only does the device become uneconomical due to the large power dissipation required, but also miniaturization becomes impossible due to the generation of a considerable amount of heat. Due to these difficulties, the desired speed-up of the digital apparatus has not been realized with the conventional current switching circuit.

Another known high-speed circuit uses a tunnel diode and this circuit does possess a sufficient operating speed at a frequency higher than 100 mHz. This tunnel diode circuit is suitable for the high speed digital circuit because of its high-speed characteristics and self-memorizing function, however, a stable circuit has rarely been constructed because of rather low stability of the conventional circuit. With a tunnel diode, the characteristics of this element, the tolerance of the power supply voltage and the properties of the input signal, must rigidly satisfy the various requirements for desired operation, because the conventional circuit usually adopts the logical system, such as the majority logic system.

Objects of the invention

One object of the present invention is to provide a high-speed stable digital circuit in which the foregoing disadvantages of conventional circuits are obviated.

Another object of the present invention is to reduce the rigid requirements for the characteristics of the diode element used.

Still another object of this invention is to reduce the requirements for the stability of the power supply voltage and for the properties of the input signal so that the circuit may be driven more easily.

A still further object is to reduce the power dissipation and consequently to facilitate miniaturization of the circuit.

All of the objects, features and advantages of this invention and the manner of attaining them will become more apparent and the invention itself will be best understood by reference to the following description of the invention taken in conjunction with the accompanying drawing.

Summary of the invention

Briefly, the present invention contemplates a current switching type digital circuit having a pulse current source instead of the D.C. current source used in the conventional current switching circuit and which generates a pulse current described herein as a clock pulse. The circuit of the invention further includes a coupling circuit arrangement for deriving two outputs from the switching circuit, one of these being in inverse phase and the other being in phase with the output, and a tunnel diode biased so as to have two stable states.

The present invention is based in principle on an arrangement in which a pulse current is switched to one of a plurality of outputs of a current switching circuit in response to an input code and causes a transformer to produce a positive or negative pulse, which triggers a tunnel diode.

In the present invention, the tunnel diode is used for reshaping and memorization. The trigger pulse to the tunnel diode is applied only through the coupling circuit. By providing a trigger pulse of sufficiently large amplitude, the requirements for the allowable deviation in the characteristics of the elements, and the allowance of the variation in the power supply voltage and in the properties of the input signal can be relaxed. Also, the use of the tunnel diode with the current switching circuit facilitates high-speed operation. Moreover, the power dissipation of the tunnel diode is rather small. Also, because of the pulse current source used, the power dissipation of the current switching circuit of the invention is small compared with that of the current switching circuit associated with a D.C. current source.

Description of preferred embodiments

Figure 1:
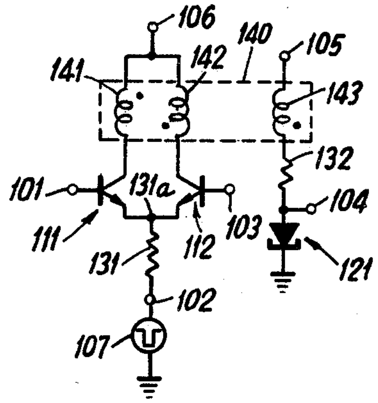
FIG. 1 is a circuit diagram of one embodiment of the invention.

Referring now to FIG. 1, a pulse current is applied from a pulse source 107 to a junction point 131*a* of the emitters of two active circuit elements such as the transistors 111 and 112. In this figure, the pulse current is obtained through a resistor 131 by applying a pulse voltage from a pulse source 107 to a terminal 102; however, it will be appreciated that the pulse current may be derived in other ways, as for example from the collector of a transistor in lieu of the source 107. The collectors of the transistors 111 and 112 are connected, through windings 141 and 142 of a transformer 140, to a terminal 106 for receiving an operating potential from a suitable power supply, not shown. The windings 141 and 142 each comprise an output leg and also form part of a coupling circuit, as will appear. The bases of the transistors 111 and 112 are connected to the terminals 101 and 103, respectively, to which control signals are applied. The anode of a tunnel diode 121 is connected to a terminal 105 for receiving an operating potential from another power supply, not shown, through a third winding 143 of the transformer 140 and a resistor 132. The tunnel diode 121 is biased so as to have two stable states by suitably choosing the voltage of the power supply connected to the terminal 105 and the resistance of the resistor 132.

The transformer 140 comprises a coupling circuit having its windings arranged so that a signal applied to one of the windings 141 and 142 may be applied in phase to the winding 143, and so that a signal applied to the other winding is applied in inverse phase to the same winding 143. For example, the signals may be transmitted in phase from the winding 142, and out of phase from the winding 141, to the winding 143, as indicated by the dot code in FIG. 1.

Figure 2:
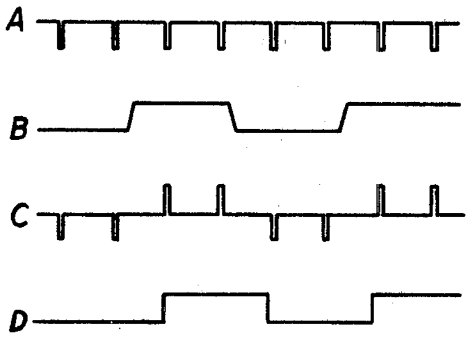
FIG. 2 shows a group of waveforms which are useful in describing the performance of the circuit shown in FIG. 1, FIGS. 3, 4 and 5 are circuit diagrams of further embodiments of the invention.

The operation of the circuit in FIG. 1 will now be described. Negative current pulses, as shown in FIG. 2A are applied to the junction 131*a* of the emitters of the transistors 111 and 112. Simultaneously, a reference voltage and an input having values above or below the reference voltage as shown in FIG. 2B are applied to the input terminals 103 and 101, respectively. When the input voltage is smaller than the reference voltage, the transistor 111 is non-conductive, with the result that the pulse current at the junction 131*a* of the emitters flows through the winding 142 of the transformer 140, inducing an in-phase pulse voltage at the winding 143 of the transformer 140. This induced voltage causes a negative trigger current to flow through the resistor 132, which in turn causes the tunnel diode to be reset to the low voltage state if the diode is then in the high voltage state.

In similar manner, when the input voltage is larger than the reefrence voltage, the pulse current at the junction of the emitters flows through the transistor 111 and through the winding 141 of the transformer 140. As a result, a phase-inverted positive pulse voltage is induced in the winding 143. On this occasion, the transistor 112 is non-conductive. The pulse voltage induced in the winding 143 causes a positive trigger current to flow through the resistor 132 so that the tunnel diode 121 is then reset back to the high voltage state.

FIG. 2C shows the trigger current pulses which flow through the resistor 132, while FIG. 2D shows the output from the tunnel diode 121 at the terminal 104.

It will thus be seen that this circuit generates an output which is reshaped and which is in perfect synchronism with the clock pulses though being delayed by less than one clock pulse interval. Although in the above illustration the input is considered to fluctuate in the vicinity of the reference voltage, the circuit can be operated with the complementary inputs applied to the control terminals 101 and 103.

Figure 3:
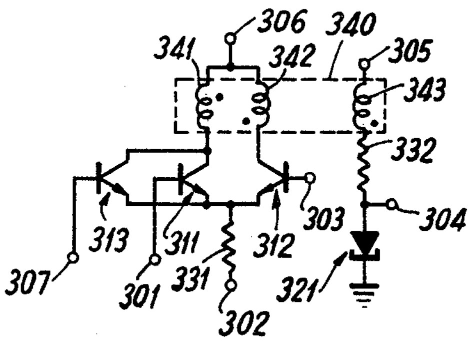

Referring now to FIG. 3, a transistor 313 is added to a circuit similar to that of FIG. 1 in order to perform the OR or the AND function. Particularly, by connecting the collector of the transistor 313 to the collector of a transistor 311, the emitter of the transistor 313 to the emitter of the transistor 311, and the base of the transistor 313 to a terminal 307, the OR or the AND operation is performed for the inputs applied to the terminals 301 and 307. Whether the OR operation or the AND operation is performed depends on the manner of assigning the polarities of the inputs to "1" and "0." Also, the NOR or the NAND operation can be performed by reversing the polarity of the third winding 343 of the transformer 340.

Although the level shift is usually necessary for a digital device which employs the current switching circuit, it may be dispensed with in the examples of FIGS. 1 and 3 because alternating-current coupling is used in the circuits. When a random input is applied to the circuit, the level fluctuation inevitably occurs. But this difficulty may be obviated by narrowing the width of the pulse supplied to the above-mentioned junction of the emitters so that the level fluctuation will not exceed the trigger level.

Figure 4:
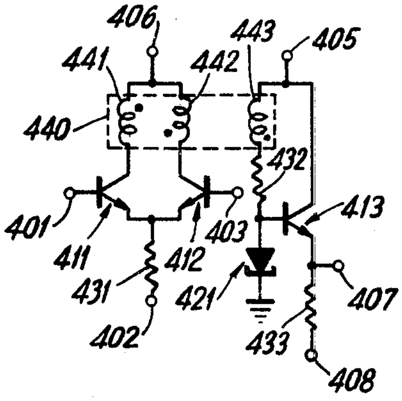

Referring next to FIG. 4, an emitter follower circuit comprising a transistor 413 and a resistor 433 is added to the output of the tunnel diode 421. The circuit in FIG. 4 is similar to that of FIG. 1 with the exception of the transistor 413 and the resistor 433. The reference numeral 408 indicates a terminal for connection to a power supply. The reference numeral 407 indicates the output terminal. The feature of this circuit is that the number of Fan-out's can be increased.

Figure 5:
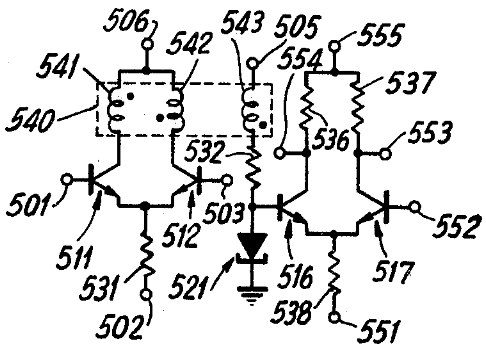

Referring to FIG. 5, which shows a still further embodiment of the invention, a current switching circuit including the transistors 516 and 517, and the resistors 536, 537 and 538, is added to the circuit of FIG. 1. The reference numerals 551 and 555 indicate terminals for connection to suitable power supplies. The terminal 552 is a reference voltage terminal, which is maintained at a voltage approximately equal to the mean value of the voltages of the two states of the tunnel diode 521. The terminals 553 and 554 are the output terminals, from which the complementary outputs are obtained. The feature of the circuit in FIG. 5 is that large output voltages are obtained.

Figures 6A, 6B:
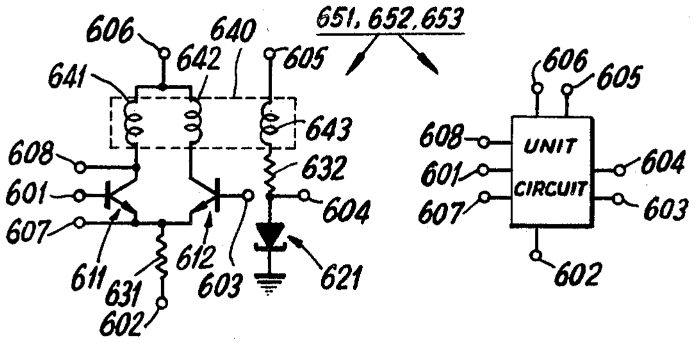
FIGS. 6A, 6B and 6C show one example of a practical application of the invention.
Figure 6C:
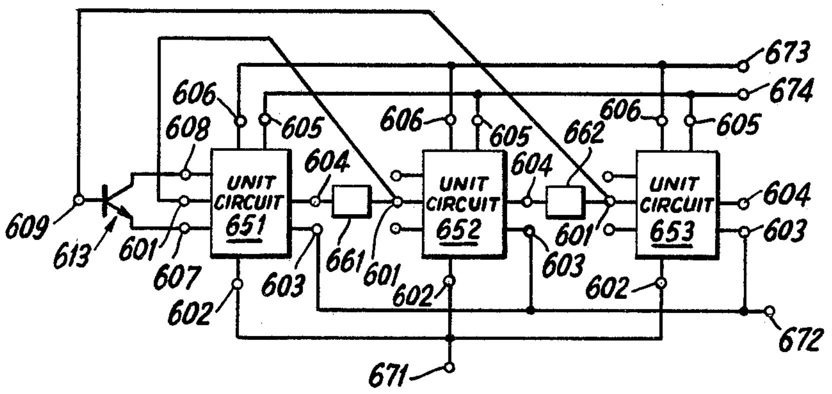

FIGS. 6A–6C illustrate a ring counter constructed with the aid of the circuit of the present invention. The circuit shown in FIG. 6A is a unit circuit of the ring counter and is a circuit of the type shown in FIG. 1 but with additional terminals 607 and 608. FIG. 6B is a simplified diagram of FIG. 6A shown in block form. The diagram shown in FIG. 6B is incorporated in the circuit of FIG. 6C, which shows a 3-bit ring counter. In FIG. 6C, the power supply terminals 606 and 605 of each of the unit circuits 651, 652 and 653 are connected to the terminals 673 and 674, respectively. The terminal 603 of each unit circuit is connected to a reference voltage source, not shown, through a terminal 672. A clock pulse train is applied to a terminal 602 of each unit circuit through a terminal 671. The collector, emitter and base of a transistor 613 are connected to the terminals 608 and 607 of the unit circuit 651 and a terminal 609, respectively. To the output terminal 604 of the unit circuit 651 a delay circuit 661 is connected, the output of which is connected to the input terminal 601 of the unit circuit 652. Similarly, the input terminal 601 of the unit circuit 653 is connected to the output terminal 604 of the unit circuit 652 through a delay circuit 662. The input terminal 601 of the unit circuit 653 is also connected to the base of the transistor 613 through the terminal 609. The polarities of the transformer windings are arranged in the same manner as in FIG. 1 with the exception of the first stage unit 651. In other words, in the unit circuit 651 of FIG. 6C, the windings 141 and 143 of FIG. 1 are in-phase and the windings 142 and 143 are in inverse phase considered with reference to FIG. 1 referred to above. With this arrangement, this circuit operates as a self-starting ring counter.

The operation of the ring counter will now be briefly described. When the unit circuit 651 holds a code "1," the unit circuit 652 becomes "1" on arrival of the next clock pulse, because the output of the unit circuit 651 is delayed by the interstage delay circuit 661. Thus, the information stored in the unit circuit is shifted on the arrival of each clock pulse. The delay time of the delay circuit must not be smaller or larger than the width and the interval of the clock pulse, respectively. Since the delayed outputs of the first and second stages are the inputs of the first stage, "1" is never supplied to the first stage as long as the first or second stage holds "1." When either of the first and second stages does not hold "1" and the third stage holds "1," "1" is supplied to the first stage on arrival of the next clock pulse. It will be thus apparent that a ring counter having an arbitrary number of stages can be constructed by arranging the unit circuit in such a manner that single "1" may be always rotated in the circuit or, in other words, that "1" may be supplied to the first stage on arrival of the next clock pulse when the result of the OR operation of the delayed outputs of all the stages, except the final stage, becomes zero.

While in the above explanation a three winding transformer is illustrated, still other embodiments of the coupling circuit of the invention may be employed which use different transformer winding arrangements, such as those seen in FIGS. 7 to 11.

Figure 7:
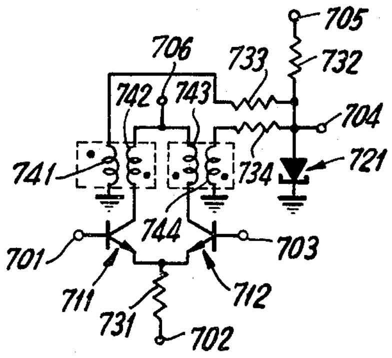
FIGS. 7, 8, 9, 10 and 11 are circuit diagrams of still further embodiments of the invention.

Referring now to FIG. 7, two transformers are used, one of which is an inverting transformer comprising windings 741 and 742, and the other is a non-inverting transformer comprising windings 743 and 744. When a pulse current flows through the transistor 711, a tunnel diode 721 is triggered through a resistor 733 by a current pulse obtained as a result of the phase inversion produced by the transformer windings. In contrast, the diode 721 is triggered through a resistor 734 by the in-phase current pulse, when the transistor 712 is conductive.

Figure 8:
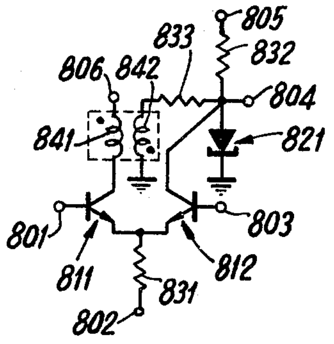

FIG. 8 illustrates one example of how a combination of direct coupling and an inverting transformer (the windings 841 and 842) can be employed instead of the phase-inverting and non-inverting transformer arrangement of FIG. 7. In this case, shifting of the direct-current level is necessary for coupling the circuits to each other.

Figure 9:
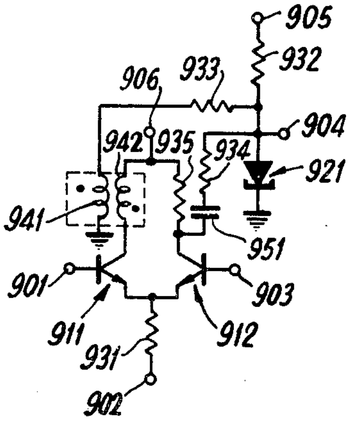

In FIG. 9, alternating-current coupling is utilized by a combination of a capacitor 951 and a resistor 934, instead of direct coupling between the diode and one of the collectors, as used in FIG. 8.

Figure 10:
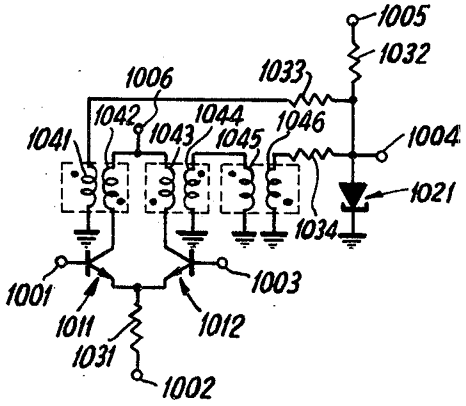
Figure 11:
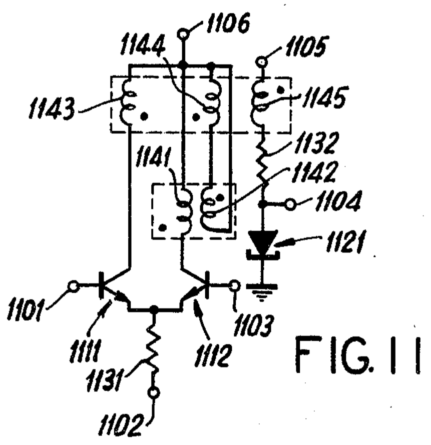

In the above-described coupling circuit using a non-inverting transformer, the waveform distortion due to the finite velocity of the narrow pulse in the winding is not negligible. To overcome this difficulty, the non-inverting transformer may be replaced by an inverting transformer cascaded connection arrangement. FIG. 10 shows an example of such replacement applied to the non-inverting transformer in the circuit of FIG. 7, while FIG. 11 shows an example applied to the circuit of FIG. 1. In FIG. 10, the pulse polarity is inverted by an inverting transformer comprising the windings 1043 and 1044, and then rearranged to the original polarity by an inverting transformer comprising the windings 1045 and 1046. In the circuit of FIG. 11, the pulse polarity is inverted by an inverting transformer comprising the windings 1141 and 1142. the pulse then being supplied to another inverting transformer having three windings. This method can be applied to a random input by selecting the width of the clock pulse to be sufficiently narrow, that is, by using a clock pulse having a small duty ratio. Furthermore, it is also applicable to the circuits of FIGS. 7, 8, 9 and 10, by way of direct-current restoration and the like, even when a small duty ratio cannot be utilized.

The tunnel diode in the above illustrations can be replaced by other negative resistance elements having N-type voltage-versus-current characteristics.

While the foregoing description sets forth the principles of the invention in connection with specific apparatus, it is to be understood that the description is made only by way of example and not as a limitation of the scope of the invention as set forth in the objects thereof.

What is claimed is:

1. A digital circuit comprising:
current switching means including a pair of active circuit elements,
said switching means including means for receiving a train of input pulses and applying the same to each of said elements simultaneously,
means for applying input operating potentials to the input of each of said active elements,
a first output leg connected between the output of one of said active elements and a terminal for receiving an operating potential,
a second output leg connected between the output of the other of said active elements and a terminal for receiving an operating potential,
a negative resistance element being N-type voltage versus-current characteristics and two stable states,
and inductive coupling means coupled between said switching means and said negative resistance element, whereby when said input pulses and said input operating potentials are applied to said active elements, said latter elements become sequentially conductive to cause said coupling means to sequentially trigger said negative resistance element from one stable state to the other.

2. The invention described in claim 1 wherein said switching means comprises a pair of transistors with said emitters connected together to receive said input pulses, and wherein said input operating potentials are applied to the base electrodes.

3. The invention described in claim 1 wherein said negative resistance element comprises a tunnel diode, and wherein said coupling means comprises a transformer having one primary winding in said first output leg with another primary winding connected in said second output leg and a secondary winding connected to said negative resistance element to trigger the same.

4. The invention described in claim 2 which further includes a third transistor having its emitter and collector connected in parallel with one of said pair of transistors and a terminal connected to its base for receiving an input potential whereby said circuit provides a selected one of OR or AND functions.

5. The invention described in claim 1 which further includes an emitter follower circuit connected to the output of said negative resistance element.

6. The invention described in claim 1 which includes another current switching circuit,
said latter switching circuit being connected to the output of said negative resistance element,
and said latter switching circuit also including a pair of transistors with an output leg connected to the collector of each transistor and an output terminal connected to each leg, whereby complementary outputs are obtained therefrom.

7. The invention described in claim 1 wherein said coupling means comprises an inverting transformer connected between the output of one of said active elements and said negative resistance element and a non-inverting transformer connected between the output of the other of said active elements and said negative resistance element.

8. The invention described in claim 1 wherein said coupling means comprises an inverting transformer connected between the output of one of said active elements and said negative resistance element and the output of the other active element being connected by direct coupling means from said latter element to said negative resistance element.

9. The invention described in claim 8 wherein said direct coupling means includes a resistor in series with a capacitor.

10. The invention described in claim 1 wherein said coupling means comprises an inverting transformer connected between the output of one of said active elements and said negative resistance element and a cascade connection inverting transformer connected between the output of the other of said active elements and said negative resistance element.

References Cited

UNITED STATES PATENTS

| | | | |
|---|---|---|---|
| 3,169,198 | 2/1965 | Kaufman | 307—206 |
| 3,189,757 | 6/1965 | Feller | 307—274 XR |
| 3,254,238 | 5/1966 | Cooperman | 307—286 XR |
| 3,319,084 | 5/1967 | Arnold | 307—218 XR |
| 3,444,392 | 5/1969 | Komamiya et al. | 307—206 |

JOHN S. HEYMAN, Primary Examiner

STANLEY T. KRAWCZEWICZ, Assistant Examiner

U.S. Cl. X.R.

307—207, 208, 215, 218, 223, 286, 322